June 3, 1947.  W. D. GOLDSMITH  2,421,558
LAWN MOWER
Filed July 6, 1944  3 Sheets-Sheet 1
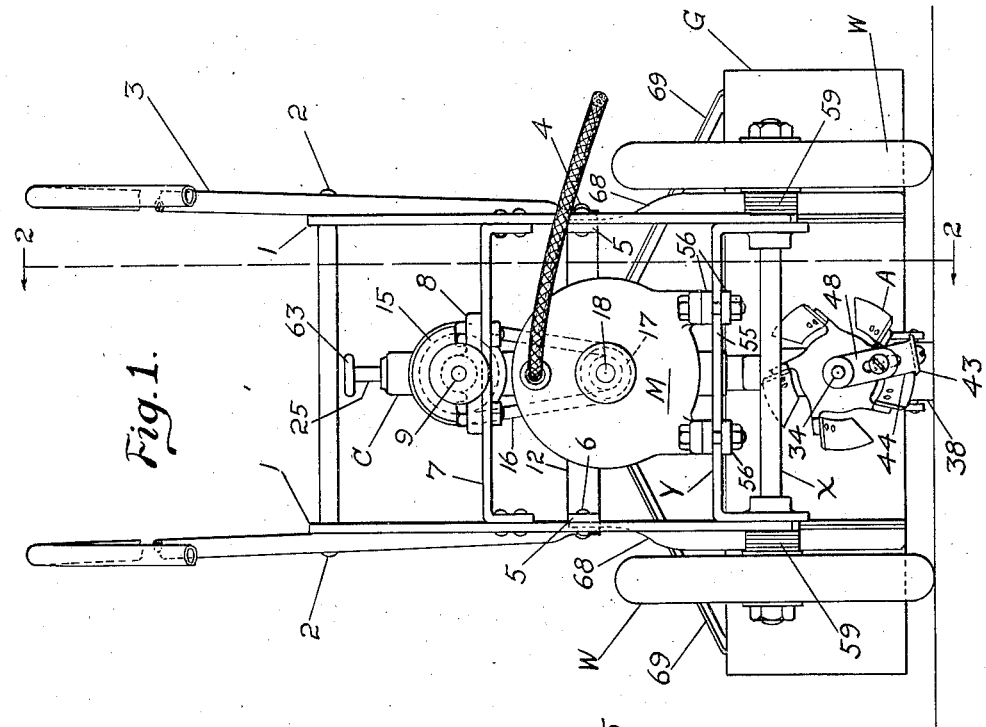
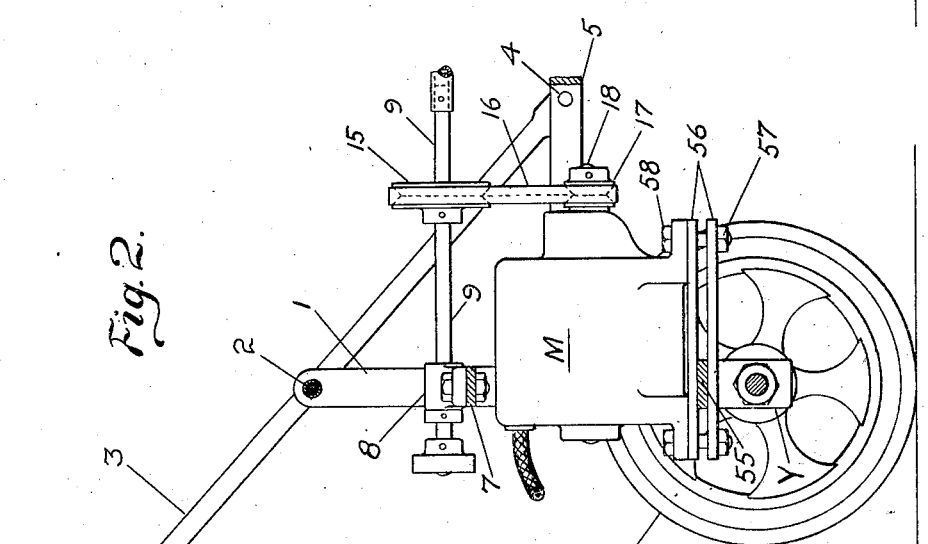
Inventor
W. D. Goldsmith.
By Wilfred E. Lawson
Attorney

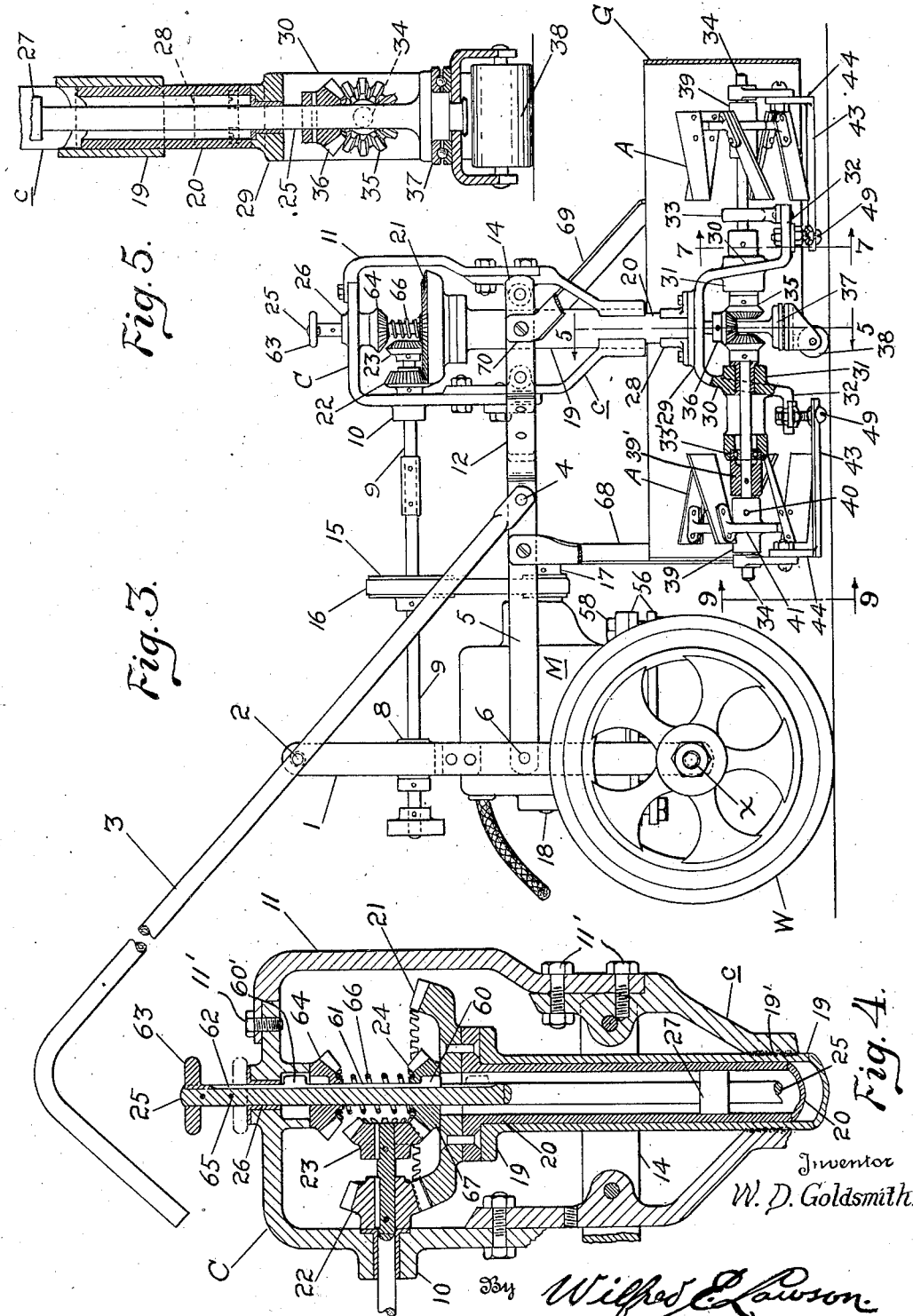

June 3, 1947.  W. D. GOLDSMITH  2,421,558
LAWN MOWER
Filed July 6, 1944  3 Sheets-Sheet 3
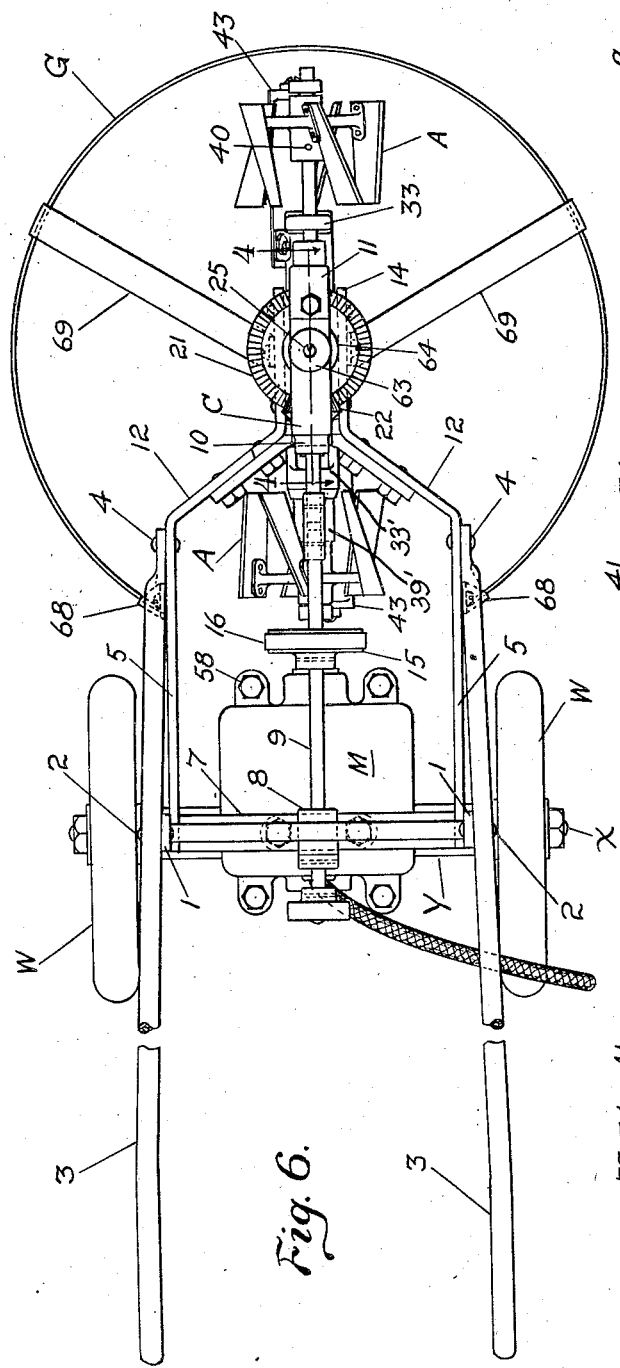
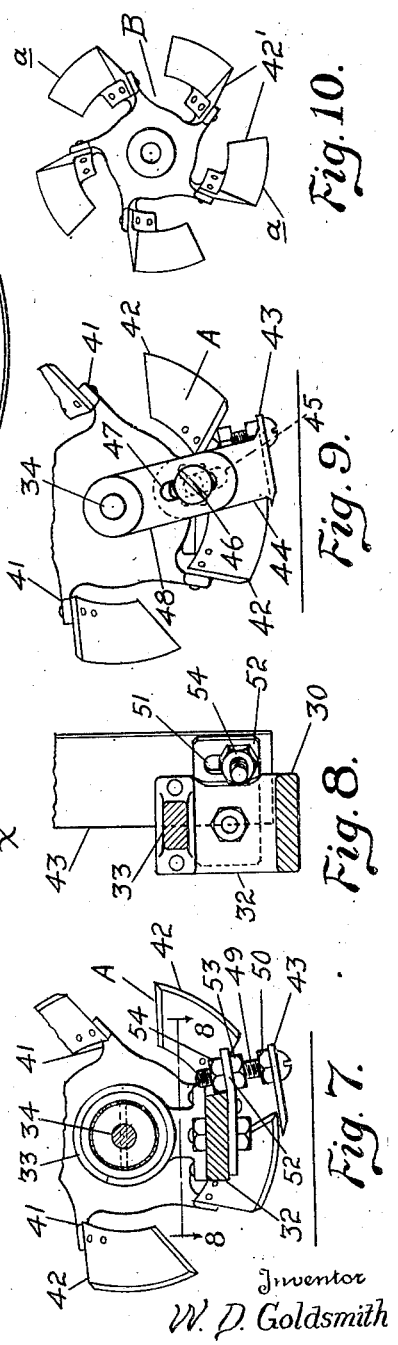
Inventor
W. D. Goldsmith
By Wilfred E. Lawson
Attorney Patented June 3, 1947

2,421,558

UNITED STATES PATENT OFFICE 2,421,558

LAWN MOWER

William D. Goldsmith, Portland, Oreg.

Application July 6, 1944, Serial No. 543,669

5 Claims. (Cl. 56—26)

This invention relates to lawn mowers, and it is a particular object of the invention to provide a machine of this kind which is power driven.

It is also an object of the invention to provide a lawn mower which is constructed in a manner to provide a plurality of cutting operations and in a manner whereby is provided an assembly that is easy to handle and well balanced.

An additional object of the invention is to provide an apparatus of this kind wherein the cutting unit may be reversely operated as the requirements of practice may prefer and particularly as may be demanded by the species of the vegetation to be cut and wherein the reverse rotation of the unit provides for an automatic sharpening of the unit.

The invention consists in the details of construction and in the combination and arrangement of the several parts of my improved lawn mower whereby certain important advantages are attained, as will be hereinafter more fully set forth.

In order that my invention may be better understood, I will now proceed to describe the same with reference to the accompanying drawings, wherein:

Figure 1 is a view in rear elevation of a lawn mower constructed in accordance with an embodiment of the invention;

Figure 2 is a fragmentary view partly in elevation and partly in section of the rear portion of the apparatus, the line of section being substantially on the line 2—2 of Figure 1;

Figure 3 is a view in side elevation of the machine as herein embodied, with parts in section;

Figure 4 is an enlarged fragmentary sectional view taken substantially on the line 4—4 of Figure 6;

Figure 5 is an enlarged fragmentary sectional view taken substantially on the line 5—5 of Figure 3;

Figure 6 is a view in top plan of the machine as herein embodied;

Figure 7 is an enlarged detailed sectional view taken substantially on the line 7—7 of Figure 3;

Figure 8 is a sectional view taken substantially on the line 8—8 of Figure 7;

Figure 9 is an enlarged fragmentary view taken on line 9—9 of Figure 3, in outer end elevation of a cutter assembly as herein embodied; and Figure 10 is a view in end elevation of a cutter assembly wherein the bed plate is omitted.

As disclosed in the accompanying drawings, Y denotes a yoke in the form of an inverted U and mounted upon an axle X of desired length. Carried by the extremities of the axle X are the ground engaging wheels W of desired size and which wheels W are free to be slid along the extremities of the axle X within certain limitations. Operatively engaged with this axle X immediately adjacent the yoke Y are the lower extremities of the upstanding posts 1.

To the upper end portions of these posts 1 are suitably fixed, as at 2, the intermediate portions of the forwardly and downwardly inclined handle members 3, the lower extremities of which are secured, as at 4, to the forward portions of the parallel side members 5. The rear portions of these members 5 are suitably anchored, as at 6, to the posts 1 at the required points thereon.

The upper portions of the posts 1 have interposed therein and suitably secured thereto a cross member 7 and mounted upon the central portion of this cross member 7 is a bearing 8 for the rear end portion of a forwardly disposed shaft 9. The forward end portion of this shaft 9 is directed through a bearing 10 in a relatively heavy and vertically disposed yoke casting C. A part 11 of this casting C is made as a separate piece and secured in place by screws 11' to be removable in order to facilitate the desired assembly of the apparatus.

The forward ends of the members 5 are continued by the inwardly and forwardly converging arms 12 which terminate in the forwardly directed parallel arms 14 which are tightly secured to the casting C whereby said casting is effectively maintained in required position.

The shaft 9 at a desired point intermediate its ends has fixed thereto a pulley 15 with which engages a belt 16 in driven connection, as at 17, with the drive or power shaft 18 of the motor M which may be electrical or of an internal combustion type as preferred. As the particular type and construction of the motor M forms no particular part of the present invention, it is not believed necessary that a detailed description or illustration thereof is required. The motor M is suitably mounted upon and supported by the yoke Y.

The casting C is relatively long and straddles from above a vertically disposed cylindrical housing 19 with the side members c of the casting welded as shown at 19', or otherwise rigidly secured to the lower portion of the housing 19. Disposed through the housing 19 for rotation therein is a tubular shaft 20, the upper extremity of which carries a gear 21 meshing with a pinion 22 which is mounted on the shaft 9 within the yoke casting C.

The shaft 9 also has fixed thereto a pinion 23 meshing with a pinion 24 carried by the shaft 25 which is disposed axially through the tubular shaft 20 and rotatably disposed through and supported by the upper portion of the casting C, as indicated at 26, while the lower end portion of this shaft 25 terminates at a desired distance below the lower end of the tubular shaft 20.

The tubular shaft 20 in its lower part is provided with a centering bearing 27 for the shaft 25. The lower end portion of the shaft 20 is rigidly secured by the brackets 28 to the central part of a bearing frame unit 29, herein disclosed as substantially in the form of an inverted U with the central portions of its side arms 30 provided with the bearings 31. The lower extremities of the arms 30 are continued by the outwardly disposed and aligned arms 32. At the outer end of one of these arms 32 there is mounted the upstanding bearing 33. Complementary to the bearing 33 there is disposed at the outer side of the opposite or other side arm 30, the outwardly directed bearing 33'.

Rotatably disposed through the bearing 33 and the adjacent bearing 31 and through the bearing 33' and the bearing 31 adjacent thereto, is the inner end portion of a shaft 34. Each of the shafts 34 within the member 29 has fixed thereto a pinion 35 meshing with a pinion 36 fixed to the shaft 25. The lower end portion of the shaft 25 is rotatably mounted upon and held by a supporting block 37. This block 37 carries an underlying roller 38 for contact with the ground surface, whereby the forward end portion of the apparatus is supported. The mounting of the shaft 25 on the block 37 is such as to permit the roller 38 to have a caster-like action. It is furthermore believed to be obvious that the block 37 operates as a thrust bearing for the shaft 25.

Adjustably mounted on the outer end portion of each of the shafts 34 is a cutter assembly A, each of which comprises a hub 39 keyed, as at 40, at a desired selected position upon the shaft 34 as the requirements of practice may deem preferable. This hub 39 has radiating therefrom the arms 41 having at their outer extremities the inwardly disposed and suitably curved cutting blades 42.

Upon that shaft 34 which passes through the bearing 33' there is interposed between the bearing 33' and the hub 39 of the adjacent assembly A, a spacer sleeve 39' which maintains the adjacent assembly in the desired position upon its supporting shaft, with respect to the center around which the two cutter assemblies turn.

The blades 42 of each of these units coact with an underlying flat bed knife 43 of desired dimensions and preferably rectangular in form. One end portion of each of the knives 43 is provided with an upstanding arm 44 provided in its upper extremity with a longitudinally disposed slot 45 through which is directed a holding or clamping bolt 46 which is also directed through a longitudinally disposed slot 47 in the lower portion of a rigid link or arm 48 freely suspended from the outer portion of the adjacent shaft 34. The slots 45 and 47, together with the bolt 46, provide means whereby the outer or adjacent extremity of the bed knife 43 may be raised in desired selective adjustment within certain limitations.

The opposite or inner end portion of the bed knife 43 is provided at its transverse center with an upstanding threaded bolt 49 rigidly secured thereto through the medium of the nut 50 threaded upon the bolt 49 and engaging the blade 43 from above and below. This bolt 49 is of desired length and is freely disposed through a slot 51 disposed transversely at the outer end of a flat arm 52 carried by and extending from an adjacent arm 32.

Threaded on the bolt 49 for clamping contact from below with the arm 52 is a holding nut 53, said nut 53 coacting with the nut 54 on the bolt 49 and which nut 54 contacts the arm 52 from above. The bolt 49 and nuts, together with the slot 51, provide means whereby the bed knife 43 may be selectively adjusted as desired lengthwise of the associated shaft 34 within the limitations afforded by the slot 51.

By proper manipulation of the nuts 53 and 54, the inner end portion of the bed knife 43 may be raised or lowered into desired selected adjustment within, of course, certain limitations. By having the arm 48 free on the shaft 34, it is only required to release the nut 53 to effect an adjustment of the bed knife 43 lengthwise of the shaft 34.

It is to be stated that under certain circumstances cutter assemblies may be employed with the bed knife 43 removed. However, under such circumstances, such assemblies B, as illustrated in Figure 10 of the drawings, will have their blades 54 each provided with a substantially razor-sharp cutting edge $a$.

It is to be particularly noted that the assemblies A, in practice, are so arranged as to operate in a circular path of a radius in excess of the spacing between the wheels W so that at no time will such wheels W travel over uncut grass or the like. It is also believed to be apparent that as the assemblies A travel in their rotary course, they will also rotate with the shafts 34, thus providing an apparatus wherein the cutting assemblies operate simultaneously in multiple paths.

The yoke Y, in the present embodiment of the invention, is of a material width. Secured to the intermediate portion 55 of the yoke Y are the vertically spaced, longitudinally extending pairs of flat strips 56, preferably of metal, and the motor M is mounted upon the upper one of each pair of these strips 56 to be supported upon the intermediate portion 55 of the yoke Y, as shown in Figure 2. By tightening or loosening the nuts 57 on the forward bolts 58 for securing the motor M to the strips 56, the belt 16 can be tightened or loosened as may be desired to assure the effective rotation of the shaft 9.

Interposed between the lower extremities of the posts 1 and the wheels W are the collars 59 mounted on and surrounding the axle X. These collars 59 may be readily applied and serve as means to permit a selective spacing between the wheels W on the axle X as may be preferred and, of course, as determined by the lengths of the collars 59 employed. This provision of means for widening or narrowing the tread or distance between the wheels W within, of course, certain limitations is of decided advantage.

It is also to be pointed out that by providing for the adjustment of the cutting blades 42 along the shafts 34 for widening or lessening the swath or increasing the radius in which the assembly A rotates, the device may be used on the very finest of lawns and, therefore, a single device can be used for cutting all practical cutting widths of swath, thus eliminating the necessity of using mowers of different sizes as may be determined by the desired width of swath as is now the general practice.

It will be obvious that with the present invention, the different adjustments of the assemblies A will not in any way require any increase in driving power because, irrespective of the adjustments of the assemblies A, the blades 42 are of the same cutting length. It may again be pointed out that the size of the swath is determined by the radius of the circular travel of the assemblies A. In view of the ready adjustments of the assemblies A, together with the manner of such adjustments, the device or apparatus has great stability so as to be substantially free of vibration.

Under certain conditions it may be desired to have the assemblies A reversely rotated.

Such reverse rotation is accomplished by means of the following construction.

The pinion 24, when effective, is locked to the shaft 25 by the sliding key 60 which is slidably positioned within the keyway or groove 61 disposed lengthwise of the shaft 25. The key 60 extends outwardly from the lower end portion of an elongated rod 62 which is entirely housed within the keyway or groove 61 and said rod 62 is of a length to terminate at the top of the shaft 25 when the key 60 is in operative engagement with the pinion 24. The upper end of this rod 62, as herein embodied, carries a pull ring 63 whereby the key 60 may be moved as desired into or out of locking engagement with the pinion 24.

In addition to the key 60, carried by the rod 62 and functioning, when the rod is in one position, to operatively couple the pinion 24 with the shaft 25, there is provided the second key 60' which is also an integral part of the rod 62 and which is shiftable therewith simultaneously with the movement of the key 60, for the purpose hereinafter described.

When the pinion 24 is keyed to shaft 25 in the manner illustrated in Figure 4 and anti-clockwise rotation is imparted to the shaft 9 and consequently to the pinions 22 and 23 which are keyed thereto, considering such anti-clockwise rotation as being observed when viewing the shaft and gears from the front of the machine, clockwise rotation will be imparted to the shaft 25 and to the tubular shaft 20. Referring now to Figure 3 it will be apparent that such clockwise rotation of shaft 25 will impart rotation in the same direction to the gear 36 and accordingly the two cutter assemblies A will be oppositely rotated one with respect to the other on the axes of the aligned or coaxial horizontal shafts 34. At the same time, through the rotation of the tubular shaft 20 the frame unit 29 which is secured by the brackets 28 to the tubular shaft 20, will be rotated clockwise thereby carrying the cutter assemblies A around in a circular path on a vertical axis. Accordingly it will be seen that when the two cutter unit assemblies A are being rotated on their respective horizontal axes they will also be moving around in a circular path on a vertical axis.

Reversal of the direction of rotation of each of the cutter unit assemblies A on their respective horizontal axes is accomplished by shifting the sliding keys 60 and 60' downwardly. This releases the coupling between the pinion 24 and the shaft 25 and couples the pinion 64 with the shaft 25 and likewise moves the pinion 64 into driving connection with the pinion 23. While this shifting of the keys and the pinion will effect reversal of the cutter unit assemblies on their horizontal axes from the direction in which they were previously driven no reversal of the tubular shaft is brought about and accordingly the assemblies continue to move in a circular path around a vertical axis and in the same direction as they did before the shift was made of the pinion gear controlling keys 60 and 60'.

In practice, it has been found of advantage to have the pinion 64 maintained free of the pinion 23 during the period the pinions 23 and 24 are effective. In the present embodiment of the invention, the pinion 64 is maintained in its raised position or free of the pinion 23 by an expansible member 66 herein disclosed as a coil spring of requisite tension surrounding the shaft 25 and interposed between the pinions 24 and 64.

The pinion 23 is constantly maintained in mesh with the pinion 24 by an underlying collar or flange 67 carried by the shaft 25.

It is also of advantage to have the assemblies A operate within a field substantially defined by an upstanding guard G of desired dimensions and which is of approximate C-shape with the free extremities thereof rearwardly disposed. The free extremities are suspended from the guide members 5 by the hangers 68 while the forward portion of the guard G is suspended by the hangers 69 depending from the forward extremities 70 of the arms 4 which are suitably secured to the opposite sides of the casting C, said extremities 70 being properly inwardly offset to allow for such connection.

From the foregoing description it is thought to be obvious that a lawn mower constructed in accordance with my invention is particularly well adapted for use by reason of the convenience and facility with which it may be assembled and operated.

I claim:

1. A mowing apparatus of the character described comprising a portable body including an upstanding housing, a tubular shaft mounted within and extending through the housing, a shaft disposed through the tubular shaft, means for rotating the tubular shaft and the second shaft, a bearing member carried by the lower portion of the tubular shaft for rotation therewith, oppositely disposed shafts carried by the bearing member and extending outwardly therebeyond, a driving connection between the second shaft and each of the shafts carried by the bearing member, and mowing blade assemblies carried by the shafts of the bearing member outwardly of said bearing member.

2. A mowing apparatus of the character described comprising a portable body including an upstanding housing, a tubular shaft mounted within and extending through the housing, a shaft disposed through the tubular shaft, means for rotating the tubular shaft and the second shaft, a bearing member carried by the lower portion of the tubular shaft for rotation therewith, oppositely disposed shafts carried by the bearing member and extending outwardly therebeyond, a driving connection between the second shaft and each of the shafts carried by the bearing member, and mowing blade assemblies carried by the shafts of the bearing member outwardly of said bearing member, said blade assemblies being selectively adjustable along the shafts of the bearing member.

3. A mowing apparatus of the character described comprising a portable body including an upstanding housing, a tubular shaft mounted within and extending through the housing, a shaft disposed through the tubular shaft, means for rotating the tubular shaft and the second shaft, a bearing member carried by the lower portion of the tubular shaft for rotation therewith, oppositely disposed shafts carried by the bearing member and extending outwardly therebeyond, a driving connection between the second shaft and each of the shafts carried by the bearing member, mowing blade assemblies carried by the shafts of the bearing member outwardly of said bearing member, a supporting block for the second shaft and with which said second shaft engages from above, and ground engaging means carried by the supporting block.

4. A mowing apparatus of the character described comprising a portable body including an upstanding housing, a tubular shaft mounted within and extending through the housing, a shaft disposed through the tubular shaft, means for rotating the tubular shaft and the second shaft, a bearing member carried by the lower portion of the tubular shaft for rotation therewith, oppositely disposed shafts carried by the bearing member and extending outwardly therebeyond, a driving connection between the second shaft and each of the shafts carried by the bearing member, mowing blade assemblies carried by the shafts of the bearing member outwardly of said bearing member, a bed knife underlying each of the blade assemblies, means for supporting one end portion of the bed knife from the bearing member, and means for supporting the opposite end portion of the bed knife from the shaft thereabove of the bearing member.

5. An apparatus of the class described comprising a portable body including upstanding posts, forwardly directed arms extending from the posts, an upstanding bearing member supported by the forward portions of the arms, a drive shaft rotatably supported by the portable body and the casting, an upstanding housing within the casting, a tubular shaft disposed therethrough and in driven connection with the first shaft, a third shaft disposed through the tubular shaft, the upper portion of the third shaft being operatively held by the bearing member, a ground engaging bearing member with which the lower extremity of the third shaft engages, said third shaft being in driven connection with the first shaft, a second bearing member carried by the lower end portion of the tubular shaft, oppositely directed shafts rotatably supported by the second bearing member and in driven connection with the third shaft, said last-named shafts extending outwardly beyond the second bearing member, and knife assemblies mounted on the extended portions of the last-named shafts for rotation therewith.

WILLIAM D. GOLDSMITH.

REFERENCES CITED

The following references are of record in the file of this patent:

UNITED STATES PATENTS

| Number | Name | Date |
|---|---|---|
| 368,076 | Doelfel et al. | Aug. 9, 1887 |
| 2,042,284 | Westcott et al. | May 26, 1936 |
| 1,048,499 | Coldwell | Dec. 31, 1912 |
| 1,241,762 | Pratt | Oct. 2, 1917 |
| 473,845 | Lombard | Apr. 26, 1892 |
| 1,130,283 | Hewett et al. | Mar. 2, 1915 |